United States Patent
Twitchell, Jr.

(10) Patent No.: US 7,904,071 B2
(45) Date of Patent: *Mar. 8, 2011

(54) DETERMINING PRESENCE OF RADIO FREQUENCY COMMUNICATION DEVICE

(75) Inventor: Robert W. Twitchell, Jr., Cumming, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 175 days.

This patent is subject to a terminal disclaimer.

(21) Appl. No.: 12/343,822

(22) Filed: Dec. 24, 2008

(65) Prior Publication Data

US 2009/0103462 A1 Apr. 23, 2009

Related U.S. Application Data

(63) Continuation of application No. 11/618,931, filed on Jan. 1, 2007.

(60) Provisional application No. 60/766,223, filed on Jan. 1, 2006.

(51) Int. Cl.
*H04M 3/00* (2006.01)
(52) U.S. Cl. ............... 455/418; 455/419; 455/67.11; 455/115.1; 340/10.33; 235/462.17
(58) Field of Classification Search .......... 455/418, 455/419, 41.2, 404.2, 456.1–456.6, 556, 455/557, 72, 466, 551, 9, 67.11, 115.1, 151.2, 455/343.1–343.6, 73; 370/310, 310.2, 328, 370/338; 340/10.33, 7.36, 10.34, 10.42, 340/10.52; 235/462.01–462.19
See application file for complete search history.

(56) References Cited

U.S. PATENT DOCUMENTS

| | | | |
|---|---|---|---|
| 4,794,368 A | 12/1988 | Grossheim | |
| 6,700,493 B1 * | 3/2004 | Robinson | 340/573.1 |
| 6,972,682 B2 * | 12/2005 | Lareau et al. | 340/568.1 |
| 2005/0068169 A1 * | 3/2005 | Copley et al. | 340/539.13 |
| 2006/0202817 A1 * | 9/2006 | Mackenzie et al. | 340/539.13 |
| 2006/0270382 A1 | 11/2006 | Lappetelainen et al. | |

OTHER PUBLICATIONS

Information Disclosure Statement (IDS) Letter Regarding Common Patent Application(s), dated Oct. 6, 2010.
Information Disclosure Statement (IDS) Letter Regarding Common Patent Application(s) submitted by Applicant on Jun. 16, 2009.

* cited by examiner

*Primary Examiner* — Kent Chang
*Assistant Examiner* — San Htun
(74) *Attorney, Agent, or Firm* — Tillman Wright, PLLC; Chad D. Tillman; Jeremy C. Doerre

(57) ABSTRACT

A RF data communication device operates in at least two states. In a first state, the device transmits a response to an RF transmission if specific data therein represents an inquiry as to the presence of one or more RF data communication devices and if specific data therein corresponds to a class maintained by the device. The device does not transmit a response if specific data in the RF transmission is not representative of an inquiry as to the presence of one or more RF data communication devices, or if specific data therein does not correspond to at least one maintained class. In a second state, the device does not transmit a response when specific data is included therein that is representative of an inquiry as to the presence of one or more RF data communication devices and specific data therein corresponds to at least one maintained class.

20 Claims, 8 Drawing Sheets

DETERMINING PRESENCE OF RADIO FREQUENCY COMMUNICATION DEVICE

I. CROSS-REFERENCE TO RELATED PATENT APPLICATIONS

The present patent application is a U.S. continuation patent application of, and claims priority under 35 U.S.C. §120 to, U.S. patent application Ser. No. 11/618,931, filed Jan. 1, 2007, which published as U.S. patent application publication no. US 2007/0155327, and which '931 application is a U.S. nonprovisional patent application of, and claims priority under 35 U.S.C. §119(e) to, U.S. patent application Ser. No. 60/766,223, filed Jan. 1, 2006. Each of these patent application and publication are hereby incorporated herein by reference.

The present application further hereby incorporates by reference each of the following patent application publications and patents, each of which is owned by the assignee of the present application: U.S. Pat. Nos. 7,155,264; 7,133,704; 6,934,540; 6,745,027; U.S. patent application publication no. US 2006/0018274; U.S. patent application publication no. US 2005/0215280; U.S. patent application publication no. US 2006/0023679; U.S. patent application publication no. US 2006/0023678; U.S. patent application publication no. US 2006/0023678; U.S. patent application publication no. US 2006/0023679; U.S. patent application publication no. US 2006/0237490; U.S. patent application publication no. US 2006/0276963; U.S. patent application publication no. US 2006/0282217; U.S. patent application publication no. US 2006/0276161; U.S. patent application publication no. US 2006/0289204; U.S. patent application publication no. US 2006/0274698; U.S. patent application publication no. US 2006/0287822; and U.S. patent application publication no. US 2006/0287008.

II. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

III. BACKGROUND OF THE INVENTION

Conventional systems for tracking and/or monitoring assets (herein generally referred to as "asset tracking systems") utilize wireless tags that generally respond to any broadcast that is made. The wireless tags usually are passive, and the responses that the passive wireless tags make are often referred to as "chirps."

More sophisticated asset tracking systems utilize semi-passive wireless tags and/or active wireless tags. A semi-passive wireless tag includes an internal power source for transmitting, and an active wireless tag includes an internal power source for both receiving and transmitting. Semi-passive and active wireless tags generally have greater capabilities than passive wireless tags due to the internal power sources. Of course, power consumption is always a concern when a wireless tag includes an internal power source, since the internal power supply limits the useful life of the wireless tag, after which time maintenance is required (e.g., replacement of the internal power source).

In improved asset tracking systems, such as those disclosed in the above patent applications and patents that have been incorporated herein by reference, a wireless tag responds to a broadcast if the broadcast includes a common designation matching a common designation of the wireless tag. Such a common designation may comprise, for example, an "asset class" associated with the wireless tag. Ad hoc networks further may be created based on such classes, which ad hoc networks are referred to as "class based" networks.

Class based networks (and common designation networks in general) are beneficial because, in such networks, a communication device, such as a wireless tag, generally only transmits a response to a broadcast if the broadcast includes a class (or common designation) that matches a class (or common designation) of that communication device. Indeed, in a communication device employing a wakeup sequence of one or more of the patent references incorporated herein by reference, such communication device does not even process a broadcast once it is determined that the broadcast fails to include a matching class of the communication device. Consequently, the internal power supply of a semi-passive or active communication device is not drained by needless processing and/or responses to broadcasts.

In asset tracking systems, it often is important to know the physical location of an asset. This could include knowing where the asset is within a limited physical area, such as a warehouse; this also could include knowing where the asset is within several different warehouses in several different geographical locations, as well as where the asset is during transit between such locations.

In a conventional asset tracking system in which communication devices comprising semi-passive or active radios are placed on the assets, a conventional method for acquiring visibility of the assets includes broadcasting within an area at regular intervals to solicit responses from all of the radios within the area. The responses from the radios reveal the radios, and thus the assets, that are in the area.

This method is not advantageous because the regular, repetitive broadcasts result in an unnecessary power drain of the responding radios. Interference also can occur if a large number of radios respond at the same time, thereby making it difficult to accurately identify all of the radios within the area that respond to the broadcast.

In an alternative conventional method, a timer is included with each radio and the radio is configured to transmit at periodic intervals as a function of the timer. The radio thereby alerts the tracking system as to the whereabouts of the radio and, thus, the asset with which it is associated. By including timers with each radio, the radios may transmit at differing times in order to avoid unnecessary interference. A radio also can be set to sleep between intervals and to be awoken by the timer for making its regular transmissions. This increases the useful life of the radios because the radios do not consume power by actively listening for broadcasts while sleeping.

This alternative method permits determinations as to the delivery and continued presence of an asset at a particular area. Nevertheless, this alternative method does include drawbacks. For instance, by using timers, the radios are inaccessible by the asset tracking system during the sleep periods. Another drawback is that the radios automatically awake and transmit without regard for their location and without regard for whether the transmission is actually warranted or even desired. In this respect, during transportation on a plane, a radio may awaken and transmit, which may cause unwanted interference with the operation of the airplane. Preprogrammed transmission at regular intervals also may reveal the presence of the asset to unauthorized persons snooping for such radio transmissions.

Accordingly, better asset tracking systems and methods are desired that minimize unnecessary power consumption and that reduce unnecessary transmissions by communication devices associated with assets.

IV. SUMMARY OF THE INVENTION

The present invention includes many aspects and features. Moreover, while many aspects and features relate to, and are described in, the context of asset tracking systems, the present invention is not limited to use only in asset tracking systems, as will become apparent from the following summaries and detailed descriptions of aspects, features, and one or more embodiments of the present invention. For instance, one or more aspects of the present invention may be utilized to determine the presence or arrival of a communication device within an area independent of any asset and/or independent of any asset tracking system. The present invention also is not limited to use in common designation or class-based networks, although in preferred embodiments common designation or class-based networks are used. Indeed, the present application may beneficially be used in asset tracking as well as sensor monitoring, hazmat monitoring, first responder scenarios, military activities and situations, mobile phone applications, and automobile dealer key tracking systems.

Accordingly, an aspect of the present invention relates to a radio frequency communication device that includes a receiver configured to receive radio frequency transmissions; a transmitter configured to make radio frequency transmissions; an interface for receiving a signal from a sensor (hereinafter "sensor signal"); and electronic components. In accordance with this aspect of the invention, the electronic components are arranged and configured such that the radio frequency communication device operates in at least two states.

In the first state, the radio frequency communication device responds to a radio frequency transmission that is received by the receiver and that includes data representative of an inquiry as to the presence of radio frequency communication devices within an area. The "data representative of an inquiry as to the presence of radio frequency communication devices within an area" simply may be a predefined value in a particular format within the broadcast in accordance with a predefined protocol. A radio frequency transmission that includes such data is sometimes referred to herein as a "Present Broadcast." The response to the Present Broadcast is made by the radio frequency communication device by making a radio frequency transmission with the transmitter that includes an identification of the radio frequency communication device. A radio frequency transmission that includes an identification of the radio frequency communication device making the transmission, and that is made in response to a Present Broadcast, is sometimes referred to herein as a "Present Response."

In the second state, the radio frequency communication device does not respond to a Present Broadcast with a Present Response; specifically, no response to a Present Broadcast comprising a radio frequency transmission is made with the transmitter that includes an identification of the radio frequency communication device, and preferably, no response to a Present Broadcast comprising a radio frequency transmission is made at all, whether including an identification of the radio frequency communication device or otherwise.

In further accordance with this aspect of the invention, the electronic components are arranged and configured such that the radio frequency communication device enters the second state from the first state upon responding to a Present Broadcast with a Present Response. The electronic components further are arranged and configured such that the radio frequency communication device enters the first state from the second state upon receiving, through the interface, a sensor signal based on sensor-acquired data that is indicative of a predetermined condition. The sensor signal itself may include the sensor-acquired data or may be representative of the sensor-acquired data and may indicate, for example, a state of the sensor. In any event, such sensor signal is deemed to provide "sensor-acquired information" through the interface.

In a feature of this aspect, the first and second states relate only to whether the communication device responds to a Present Broadcast. Thus, the communication device otherwise remains responsive to other broadcasts in general and/or remains responsive to transmissions directed to the device. For example, in class-based networks, the communication device preferably remains responsive to any transmission including a class to which it is a member, whether the communication device is in the first state or the second state. Such transmission to the communication device may relate to a change in sensor states; maintenance of the communication device (e.g., checking the status of the internal power supply); or enabling or disabling of certain features or capabilities of the communication device (including the practicing of the present invention). In an alternative—and less preferred—feature, the first and second states relate not only to whether the communication device responds to a Present Broadcast, but whether the communication device responds to any broadcast at all. In this respect, when the communication device is in the second state, the communication device may not respond to any broadcasts at all.

In yet another feature of this aspect, the electronic components are further configured such that the radio frequency communication device makes a radio frequency transmission upon receiving, through the interface, sensor-acquired information that indicates a predetermined condition.

In another feature of this aspect, the radio frequency communication device further includes a computer processor that processes received radio frequency transmissions and received sensor-acquired information. The computer processor preferably effects state changes of the radio frequency communication device as a function of received radio frequency transmissions and received sensor-acquired information.

In still yet another feature, the communication device enters the first state from the second state after a predetermined period of time has transpired according to a timer of the communication device. This feature is beneficial, for example, if a sensor associated with an radio frequency communication device fails and if the radio frequency communication device would not otherwise enter the first state from the second state. In this regard, the time period before the radio frequency communication device enters, by default, the first state from the second state may be a significant period of time.

In still yet another feature, the communication device enters the first state from the second state after a predetermined number of failed attempts to communicate with a server have occurred. This feature is beneficial, for example, in identifying radio frequency communication devices in a certain area that are having technical difficulties in their communications.

In still another feature, the radio frequency communication device enters the first state from the second state upon receipt, via the receiver of radio frequency communication device, of an instruction to enter the first state. The instruction may be specific to a particular radio frequency communication device or generic to a plurality of radio frequency communication devices. Furthermore, a special common designation, such as a special class, may be utilized whereby a broadcast to such common designation would instruct radio frequency communication device having that common designation to enter the first state. This feature is beneficial, for example, if a sensor associated with an radio frequency communication device fails and if the radio frequency communication device would not otherwise enter the first state from the second state. This enables, for example, a sever to look for a radio frequency communication device within a particular area.

Another aspect of the invention relates to a method performed by a radio frequency communication device. The method includes: the first steps of responding to a Present Broadcast with a Present Response and then not responding to any further Present Broadcasts; and, repeating the first steps upon receiving, through an interface of the radio frequency communication device, sensor-acquired information that is indicative of a predetermined condition. Thus, after receiving such sensor-acquired information, the radio frequency communication device does, in fact, respond to the next Present Broadcast.

In a feature of this aspect of the invention, the method further includes the step of making a radio frequency transmission with the transmitter of the radio frequency communication device upon receiving, through an interface of the radio frequency communication device, the sensor-acquired information indicative of the predetermined condition.

In accordance with this and other aspects of the invention, the predetermined condition may comprise movement of the radio frequency communication device; a change, exceeding a threshold, with respect to the location of the radio frequency communication device as determined based on GPS data; an/or a temperature associated with the radio frequency communication device exceeding a predetermined threshold. With further respect to location, for example, the data from the GPS receiver may be compared against a range of x-y coordinates for "geo fencing" of the communication device (e.g., 89.2412<x,89.4522 and 145.2332<y<145.8772), with a predetermined condition being triggered by the GPS data that indicates the communication device being outside of a predefined geographical area. An examples of this is described below with regard to FIGS. 1-8.

In further accordance with the invention, the predetermine condition may comprise a change in state of a sensor associated with a radio frequency communication device and the sensor may or may not indicate movement from an area. Such a state change could indicate, for example, the breaking of a magnetic seal or other seal of a container wherein the sensor monitors the seal of the container. The container could be, for example, a hazardous waste container or an international shipping container. In such case, the Present Broadcast could be used to reveal those containers for which the seals have been broken.

In another feature of the invention, the radio frequency communication device may comprises a node in one or more common designation networks. In this respect, the data representative of a general inquiry as to the presence of radio frequency communication devices may be a predefined common designation. Indeed, the data representative of a general inquiry as to the presence of radio frequency communication devices may be a common designation of "present."

In a related feature, the radio frequency communication device is associated with an asset being tracked in an asset tracking system. The asset tracking system may be a class based asset tracking system, and the data representative of a general inquiry as to the presence of radio frequency communication devices may be a predefined class designation. Indeed, the data representative of a general inquiry as to the presence of radio frequency communication devices may be a class designation of "present."

In addition to the aforementioned aspects and features of the present invention, the present invention further includes the various possible combinations of such aspects and features.

It will be appreciated that, in accordance with one or more aspects, determinations can be made as to when an asset has arrived in an area and when an asset has left the area. Furthermore, this can be achieved without significantly reducing battery life, and this can be achieved without unnecessary radio frequency transmissions.

V. BRIEF DESCRIPTION OF THE DRAWINGS

One or more preferred embodiments of the present invention now will be described in detail with reference to the accompanying drawings, wherein.

VI. DETAILED DESCRIPTION

Figure 1:
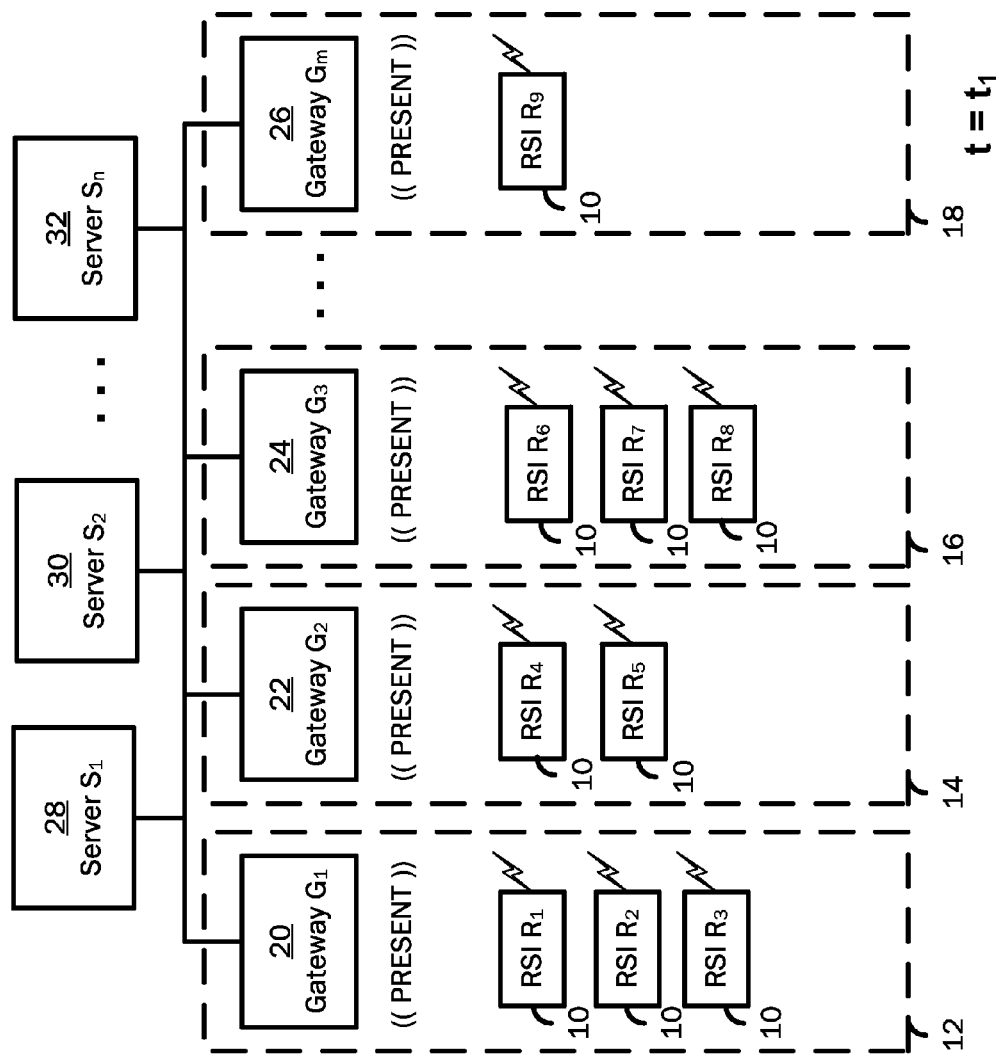
FIG. 1 is a first illustration representative of locations, states, and state transitions of radio frequency communication devices, at a first time, in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Turning now to the drawings, FIG. 1 is representative of locations, states, and state transitions of radio frequency communication devices shown at a first time in accordance with one or more preferred embodiments of the present invention.

In this regard, nine radio frequency communication devices 10 labeled "RSI $R_1$" through "RSI $R_9$" are shown in FIG. 1. Each radio frequency communication device 10 preferably comprises a movable remote sensor interface or "RSI" that includes its own internal power source, such as a battery. Each RSI preferably is active or at least semi-active, and each RSI preferably is disposed in electronic communication with one or more sensors through one or more interfaces of the RSI for receiving sensor signals including, for example, sensor-acquired data. Such sensors may comprise, for example, temperature sensors, motion sensors, accelerometer sensors, and GPS receivers.

The nine communication devices 10 are distributed among m different physical areas (m being some integer greater than 1). These areas are represented by areas 12,14,16,18 illustrated in FIG. 1. Each area may be at the same location as another area or at a different location as another area. For instance, area 12 may represent a boat dock (area) at a port of entry (location) and area 14 may represent a truck loading dock (area) at the same port of entry (location). Alternatively, area 12 may represent a warehouse (area) in Charleston, S.C. (location) and area 14 may represent a warehouse (area) in San Diego, Calif. (location). Moreover, area 16 may represent the cargo area (area) of a transport vehicle (location) in route between area 12 in Charleston and area 14 in San Diego, and the location thus need not be stationary. In this example, the location is dynamic and changes as the transport vehicle moves between Charleston and San Diego.

Furthermore, in accordance with one or more aspects of the present invention, at least one of the sensors associated with an RSI is utilized to indicate the likely removal of the RSI from an area, as discussed in greater detail below.

Each of the m areas includes at least one gateway and, accordingly, there are at least m gateways represented in FIG. 1. These gateways are represented by gateways 20,22,24,26. In this regard, gateway 20 is illustrated as being within area 12 and is labeled "Gateway $G_1$"; gateway 22 is illustrated as being within area 14 and is labeled "Gateway $G_2$"; gateway 24 is illustrated as being within area 16 and is labeled "Gateway $G_3$"; and gateway 26 is illustrated as being within area 18 and is labeled "Gateway $G_m$".

Each gateway 20,22,24,26 preferably is disposed in electronic communication with one or more servers labeled, respectively, "Server $S_1$", "Server $S_2$", and "Server $S_n$", wherein n is some integer greater than 1. The servers are represented by server 28,30,32 and may be remotely located to each other. The servers 28,30,32 also may be remotely located to the gateways 20,22,24,26. The electronic communication between the servers and the gateways may be accomplished, for example, by way of cellular communications, satellite communications, and/or Internet communications.

Preferably, the communication devices 10 are associated with assets, and the servers 28,30,32 collectively include the programs and databases of one or more asset tracking systems for tracking and/or monitoring of the assets with which the communication devices 10 are associated. The gateways and the communication devices further preferably form common designation networks and, more preferably, class based networks.

With further reference to FIG. 1, each gateway 20,22,24,26 is shown at a first time $t_1$ in FIG. 1 as making a respective radio frequency transmission that preferably awakens each communication device 10 from a sleep or standby mode, as appropriate. In this regard, this radio frequency transmission preferably comprises a wakeup broadcast that includes a common designation comprising a class designation. If the class designation matches a class designation maintained in a table of class designations of a respective communication device 10, then that communication device 10 awakens and makes a radio frequency transmission in response. For brevity, a radio frequency transmission that is a wakeup broadcast and that includes a class designation is sometimes referred to herein as a "Class-Present Wakeup Broadcast" and is simply labeled "Present" in the drawings. As will be appreciated, the Class-Present Wakeup Broadcasts represent a particular type of—and if a subset of—Present Broadcasts.

Additionally, the transmission in response to the Class-Present Wakeup Broadcast by the respective communication device 10 preferably includes an identification of the respective communication device 10. Such an identification may uniquely identify the respective communication device 10 or radio of the communication device 10. Alternatively, the identification may uniquely identify one or more assets with which the communication device 10 is associated in an asset tracking system, especially when the communication device is a wireless reader tag (WRT) or similar device. Alternatively, the identification may serve to distinguish the respective communication device 10 from one or more other communication devices 10 without uniquely identifying the respective communication device 10 from all other communication devices 10.

The Class-Present Wakeup Broadcast made by each gateway 20,22,24,26 is received by each communication device within the respective area of the gateway, and each communication device 10 is shown as responding to the Class-Present Wakeup Broadcast, wherein each response is represented by a lightning bolt.

As will be appreciated, an RSI further can retransmit the Class-Present Wakeup Broadcast to other RSIs that fall outside of the gateway range, thereby expanding the effective range of communications with the gateway. Communications between a gateway and one or more RSIs outside of the gateway's range, via one or more RSIs within range, is disclosed in one or more of the incorporated references but, for clarity, is not shown in the present drawings. Communications between an RSI and a gateway further may be through other RSIs even when all RSIs are within range of the gateway, as disclosed, for example, in many of the incorporated references such as U.S. Pat. Nos. 6,745,027 and 6,934,540.

As will be appreciated from the following detailed description, and in accordance with preferred embodiments of the invention, the fact that each of the nine communication devices 10 responds to the Class-Present Wakeup Broadcast indicates that none of the nine communication devices 10 likely were present in the areas 12,14,16,18 as shown in FIG. 1 at the time of a Class-Present Wakeup Broadcast first preceding that at time $t_1$. Furthermore, each communication device 10 responds to a Class-Present Wakeup Broadcast, as appropriate, regardless of the number of times that the communication device 10 has previously responded. Whether a communication device 10 responds preferably is not a function of the number of times that communication device 10 has responded in the past.

The Class-Present Wakeup Broadcast may be performed by each respective gateway "on demand" upon receipt of an instruction to such effect from one of the servers 28,30,32. Alternatively, each gateway may be configured to make the Class-Present Wakeup Broadcast in accordance with a predetermined schedule, such as at regular intervals of time. If timers are utilized, then the timers of the gateways determine the resolution within which a communication device is identified as having arrived at a particular area. Still yet, a particular gateway may be triggered to make a Class-Present Wakeup Broadcast by one or more sensors, such as motion, optical, or infrared sensors. Indeed, while gateways are concurrently shown in the drawings as making Class-Present Wakeup Broadcasts, a gateway nevertheless may make a Class-Present Wakeup Broadcast independent of one or more other gateways.

The transmissions made in response to the Class-Present Wakeup Broadcast and, in particular, the identification included in each response, is communicated through each gateway to an appropriate one or more of the servers 28,30,32 that is tasked with keeping track of the location of each communication device 10. Based upon the particular gateway from which a respective identification is received, the server may then determine that the respective communication device 10 corresponding to that identification is within the area of that particular gateway.

Accordingly, from the responses to the Class-Present Wakeup Broadcasts shown in FIG. 1, the appropriate server determines that: RSIs $R_1$, $R_2$, and $R_3$ are within the area of Gateway $G_1$; RSIs $R_4$ and $R_5$ are within the area of Gateway $G_2$; RSIs $R_6$, $R_7$, and $R_8$ are within the area of Gateway $G_3$; and RSI $R_9$ is within the area of Gateway $G_m$. Preferably, the server records and maintains such location information for each of the communication devices 10.

Figure 2:
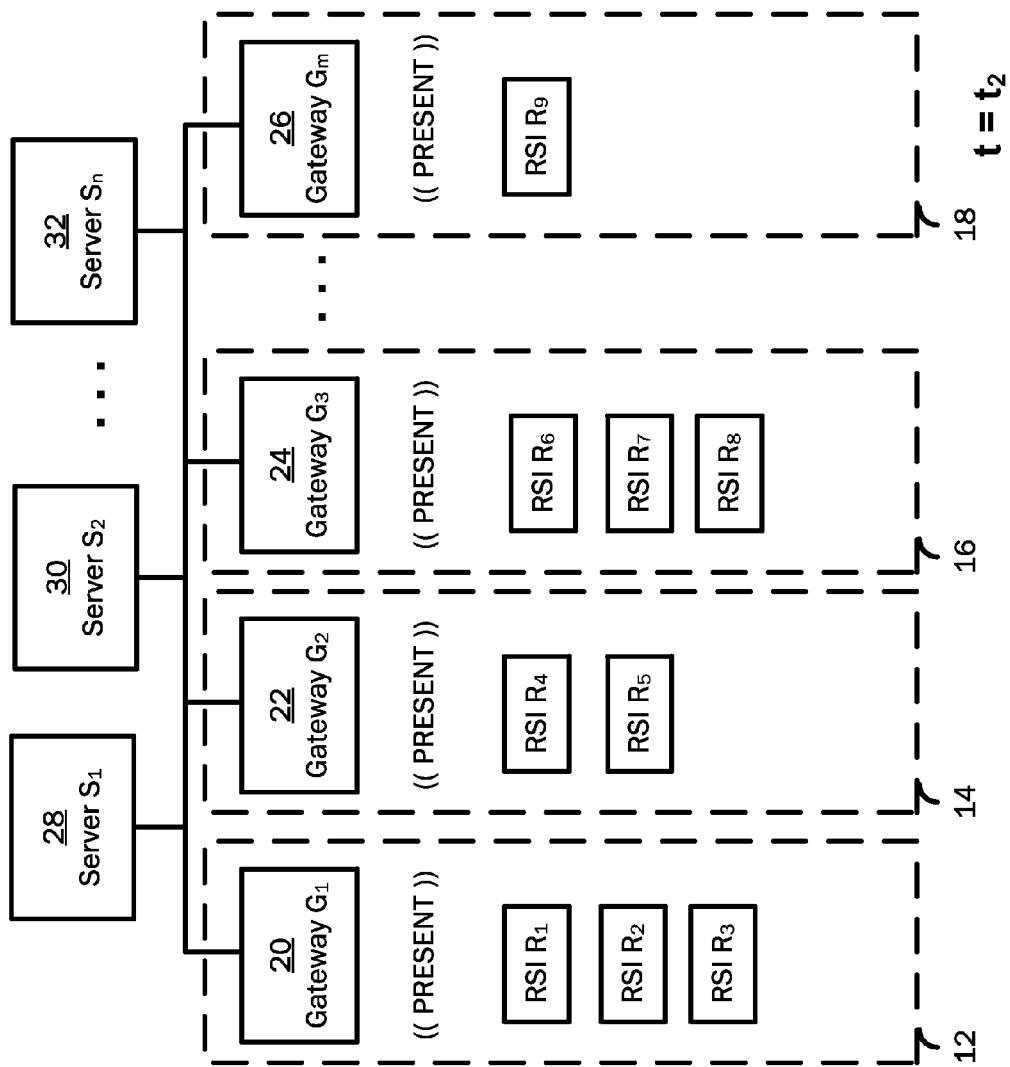
FIG. 2 is a second illustration representative of locations, states, and state transitions of radio frequency communication devices, at a second time subsequent to the first time, in accordance with one or more preferred embodiments of the present invention.

Thereafter, each gateway 20,22,24,26 is shown at a second time subsequent to the first time in FIG. 2 as making a respective subsequent Class-Present Wakeup Broadcast. Again, the Class-Present Wakeup Broadcast made by each gateway 20,22,24,26 is received by each communication device within the respective area of the gateway; however, none of the communication devices 10 is shown as responding to the Class-Present Wakeup Broadcast. In accordance with preferred embodiments of the invention, none of the communication devices 10 respond to the Class-Present Wakeup Broadcast because each has already responded to a Class-Present Wakeup Broadcast at time $t_1$, and each has yet to move from the respective area in which it was located since that time.

As will be appreciated, the server tasked with keeping track of the location of each communication device 10 receives no identification from any communication device 10 via the gateways 20,22,24,26 and, based thereon, does not update any location information for any of the communication devices 10. Having received no identifications in response to the Class-Present Wakeup Broadcasts, the server assumes that none of the communication devices 10 have been moved from their respective areas as recorded by the server.

Figure 3:
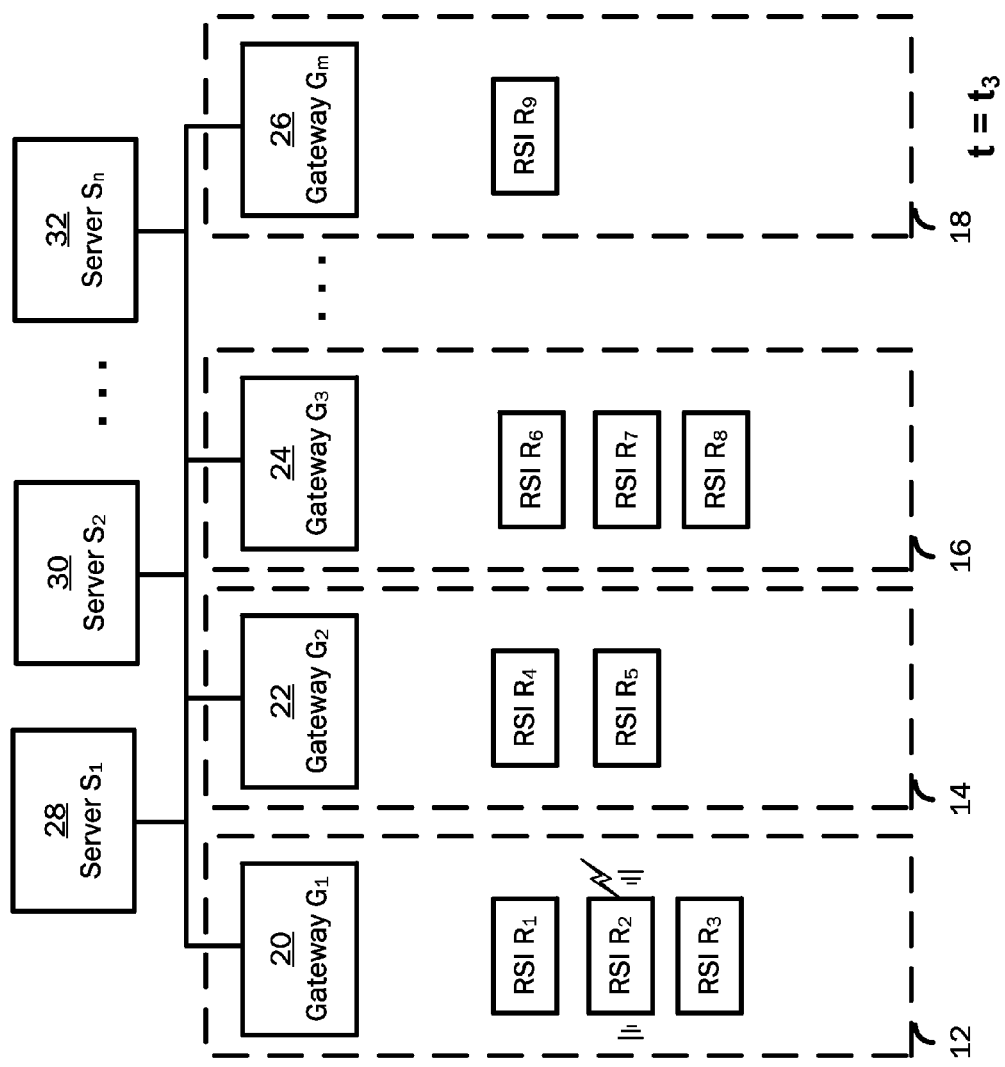
FIG. 3 is a third illustration representative of locations, states, and state transitions of radio frequency communication devices, at a third time subsequent to the second time, in accordance with one or more preferred embodiments of the present invention.

At a third time subsequent to the second time, as shown in FIG. 3, communication device 10 labeled as RSI $R_2$ is moved from the area 12 of the gateway 20 (Gateway $G_1$). The RSI $R_2$ preferably is disposed in electrical communication with a motion sensor through an interface thereof and, upon being moved, the RSI $R_2$ preferably receives sensor-acquired information from the motion sensor that indicates the movement of the RSI $R_2$. Such electrical communication may be wired or wireless, and the sensor may be internal or external to a housing of the communication device. The RSI $R_2$ preferably is configured, upon receipt of such sensor-acquired information through the interface, to make a radio frequency transmission including an identification thereof to an appropriate server via the gateway 20. The server preferably is the server that records and maintains the location information for each of the communication devices 10 and, upon receipt of the communication from RSI $R_2$, the server preferably records information pertaining to such communication. In particular, the server preferably records information indicating movement of RSI $R_2$ and the time $t_3$ of such movement. The movement is presumed to indicate the likely removal of the RSI $R_2$ from the area. Other sensors, or a combination of sensors, further can be used to indicate such likely removal. For example, the combined readings from both a motion sensor and a temperature sensor could be used to indicate likely removal of the communication device from a particular area. Alternatively, temperature rather than motion could be used as an indicator that the communication device likely has moved from a controlled environment of a particular area.

Figure 4:
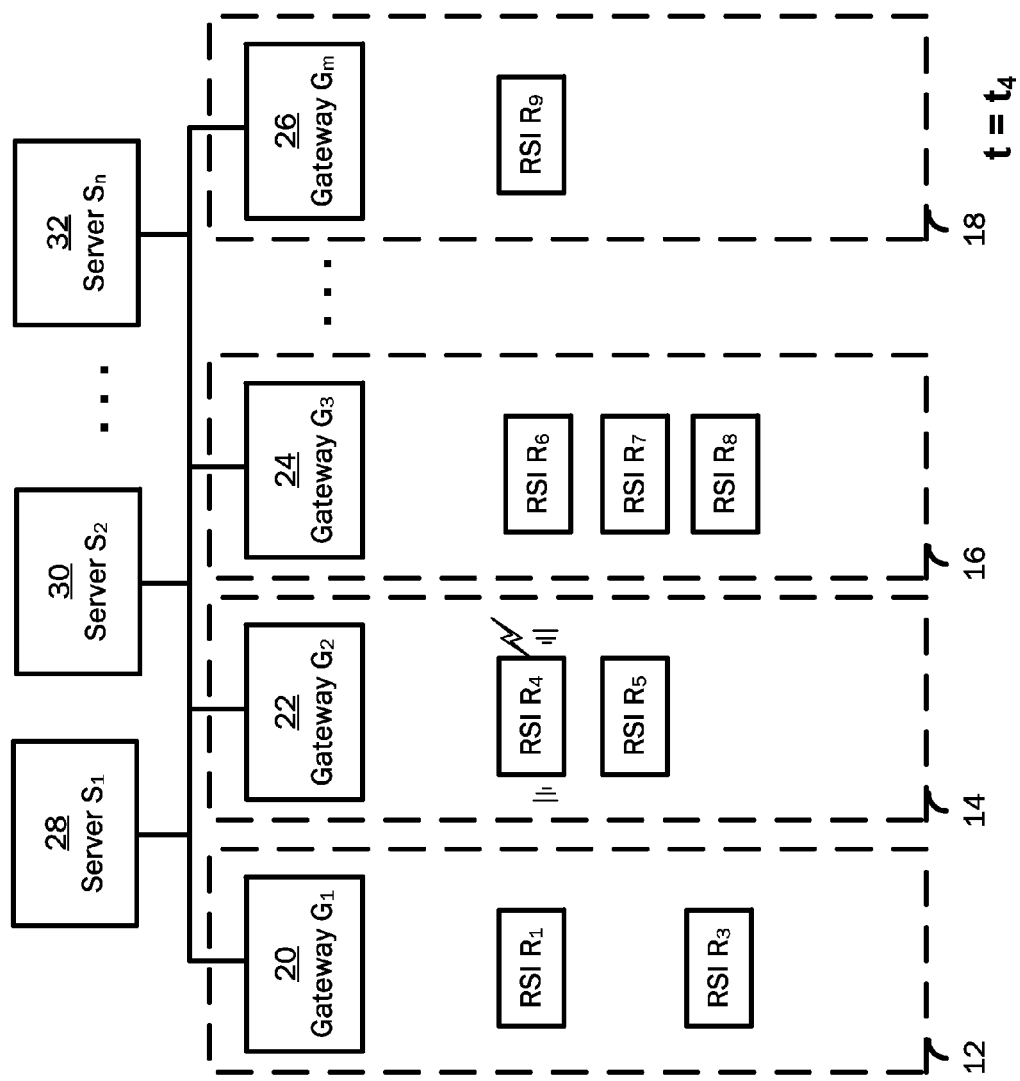
FIG. 4 is a fourth illustration representative of locations, states, and state transitions of radio frequency communication devices, at a fourth time subsequent to the third time, in accordance with one or more preferred embodiments of the present invention.

At a fourth time subsequent to the third time, as shown in FIG. 4, communication device 10 labeled as RSI $R_4$ is moved from the area 14 of the gateway 22 (Gateway $G_2$). The RSI $R_4$ preferably is disposed in electrical communication with a motion sensor through an interface thereof and, upon being moved, the RSI $R_4$ preferably receives sensor-acquired information from the motion sensor that indicates the movement of the RSI $R_4$. Such electrical communication may be wired or wireless, and the sensor may be internal or external to the RSI. The RSI $R_4$ preferably is configured, upon receipt of such sensor-acquired information through the interface, to make a radio frequency transmission including an identification thereof to an appropriate server via the gateway 22. The server preferably is the server that records and maintains the location information for each of the communication devices 10 and, upon receipt of the communication from RSI $R_4$, the server preferably records information pertaining to such communication. In particular, the server preferably records information indicating movement of RSI $R_2$ and the time $t_4$ of such movement.

Figure 5:
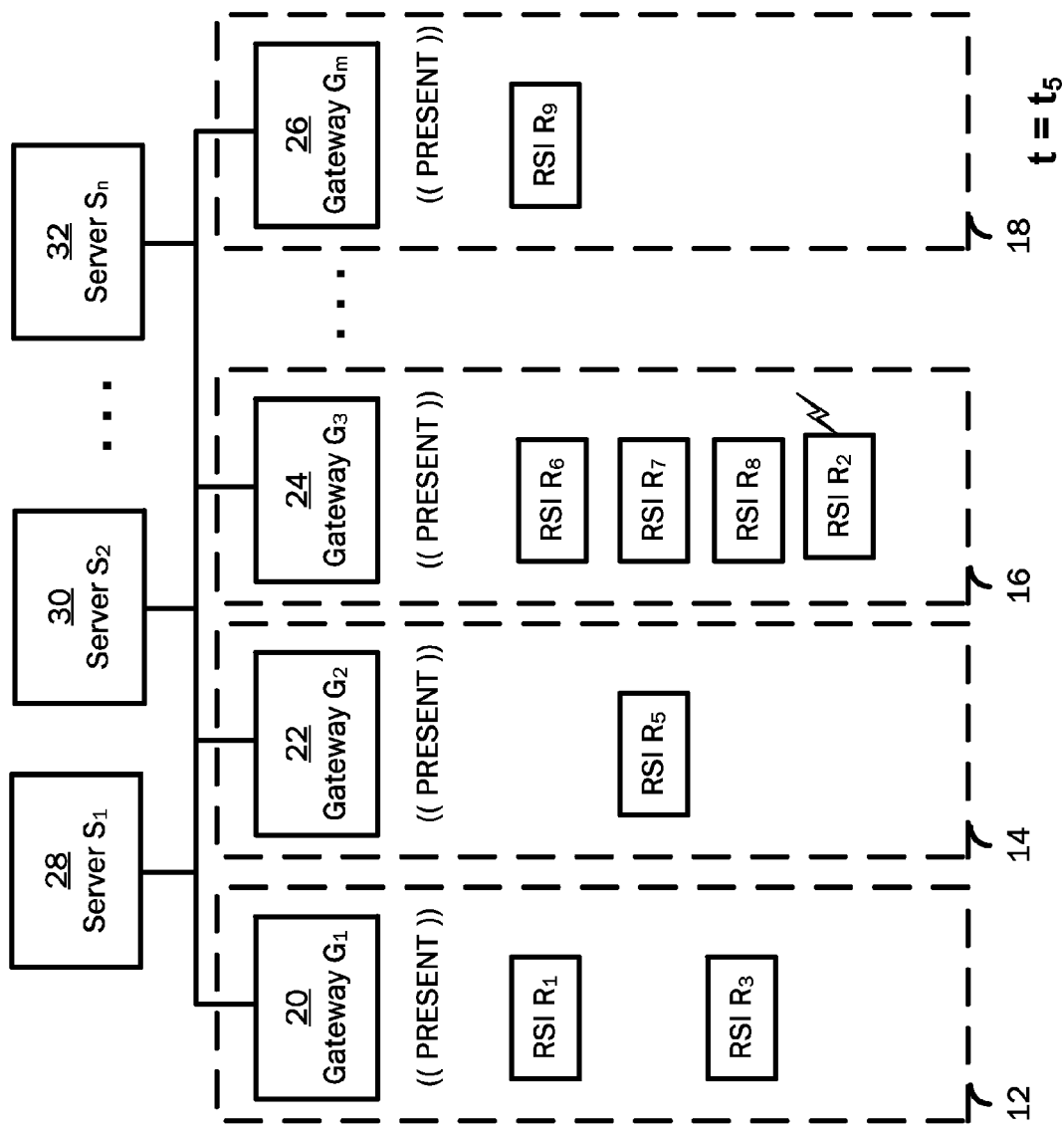
FIG. 5 is a fifth illustration representative of locations, states, and state transitions of radio frequency communication devices, at a fifth time subsequent to the fourth time, in accordance with one or more preferred embodiments of the present invention.

At a fifth time subsequent to the fourth time, as shown in FIG. 5, the gateways 20,22,24,26 again make Class-Present Wakeup Broadcasts. As will be appreciated, none of the communication devices 10 respond to the Class-Present Wakeup Broadcast that have not moved since the first time $t_1$; such communications generally would be unnecessary and would thus needlessly drain power sources of the communication devices 10. On the other hand, RSI $R_2$ which was moved at time $t_3$ has since moved into the area of gateway 24 (Gateway $G_3$) by time $t_5$ and, in response to the Class-Present Wakeup Broadcast received from gateway 24, the RSI $R_2$ does make a responsive transmission that includes an identification thereof. As a result of this responsive transmission, the server tracking the location information of RSI $R_2$ updates the location information to indicate that RSI $R_2$ now is in area 16 as of time $t_5$. RSI $R_4$, on the other hand, did not respond to the Class-Present Wakeup Broadcasts and, as such, its absence from areas 12,14,16,18 is identified. It further deemed that it was moved from area 14 at time $t_4$.

Figure 6:
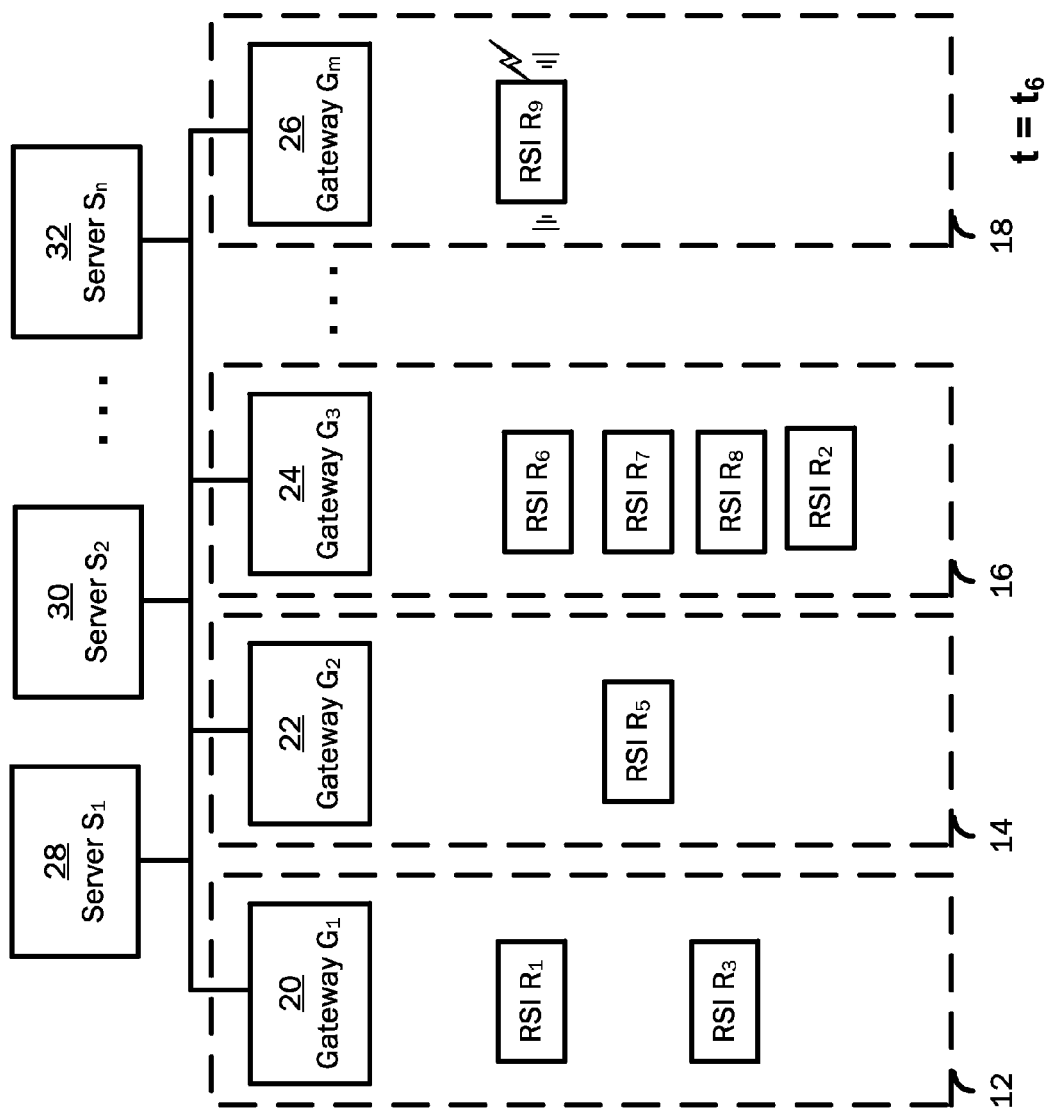
FIG. 6 is a sixth illustration representative of locations, states, and state transitions of radio frequency communication devices, at a sixth time subsequent to the fifth time, in accordance with one or more preferred embodiments of the present invention.

At a sixth time subsequent to the fifth time, as shown in FIG. 6, communication device 10 labeled as RSI $R_9$ is moved from the area 18 of the gateway 26 (Gateway $G_m$). The RSI $R_9$ preferably is disposed in electrical communication with a motion sensor through an interface thereof and, upon being moved, the RSI $R_9$ preferably receives sensor-acquired information from the motion sensor that indicates the movement of the RSI $R_9$. Such electrical communication may be wired or wireless, and the sensor may be internal or external to the RSI. The RSI $R_9$ preferably is configured, upon receipt of such sensor-acquired information through the interface, to make a radio frequency transmission including an identification thereof to an appropriate server via the gateway 26. The server preferably is the server that records and maintains the location information for each of the communication devices 10 and, upon receipt of the communication from RSI $R_9$, the server preferably records information pertaining to such communication. In particular, the server preferably records information indicating movement of RSI $R_9$ and the time $t_6$ of such movement.

Figure 7:
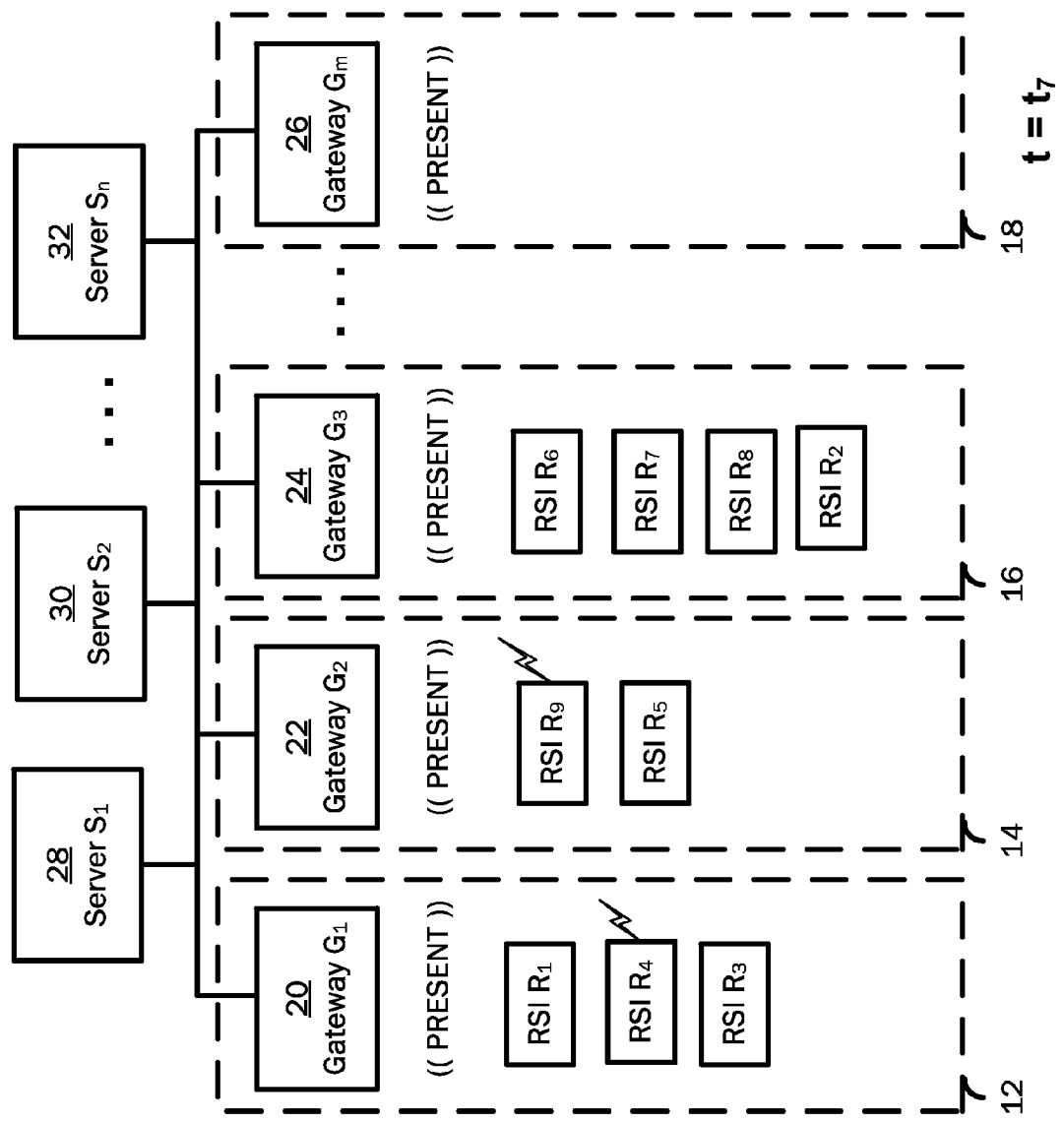
FIG. 7 is a seventh illustration representative of locations, states, and state transitions of radio frequency communication devices, at a seventh time subsequent to the sixth time, in accordance with one or more preferred embodiments of the present invention.

At a seventh time subsequent to the sixth time, as shown in FIG. 7, the gateways 20,22,24,26 again make Class-Present Wakeup Broadcasts. As will be appreciated, none of the communication devices 10 respond to the Class-Present Wakeup Broadcast that have not moved since the preceding Class-Present Wakeup Broadcast at time $t_5$; such communications generally would be unnecessary and would thus needlessly drain power sources of the communication devices 10. On the other hand, RSI $R_9$ which was moved at time $t_6$ has since moved into the area 14 of gateway 22 (Gateway $G_2$) by time $t_7$ and, in response to the Class-Present Wakeup Broadcast received from gateway 22, the RSI $R_9$ does make a responsive transmission that includes an identification thereof. As a result of this responsive transmission, the server tracking the location information of RSI $R_9$ updates the location information to indicate that RSI $R_9$ now is in area 14 as of time $t_7$.

Additionally, RSI $R_4$ which was moved at time $t_4$ has moved into the area 1 of gateway 20 (Gateway $G_1$) by time $t_7$ and, in response to the Class-Present Wakeup Broadcast received from gateway 20, the RSI $R_4$ does make a responsive transmission that includes an identification thereof. As a result of this responsive transmission, the server tracking the location information of RSI $R_4$ updates the location information to indicate that RSI $R_4$ now is in area 10 as of time $t_7$.

Figure 8:
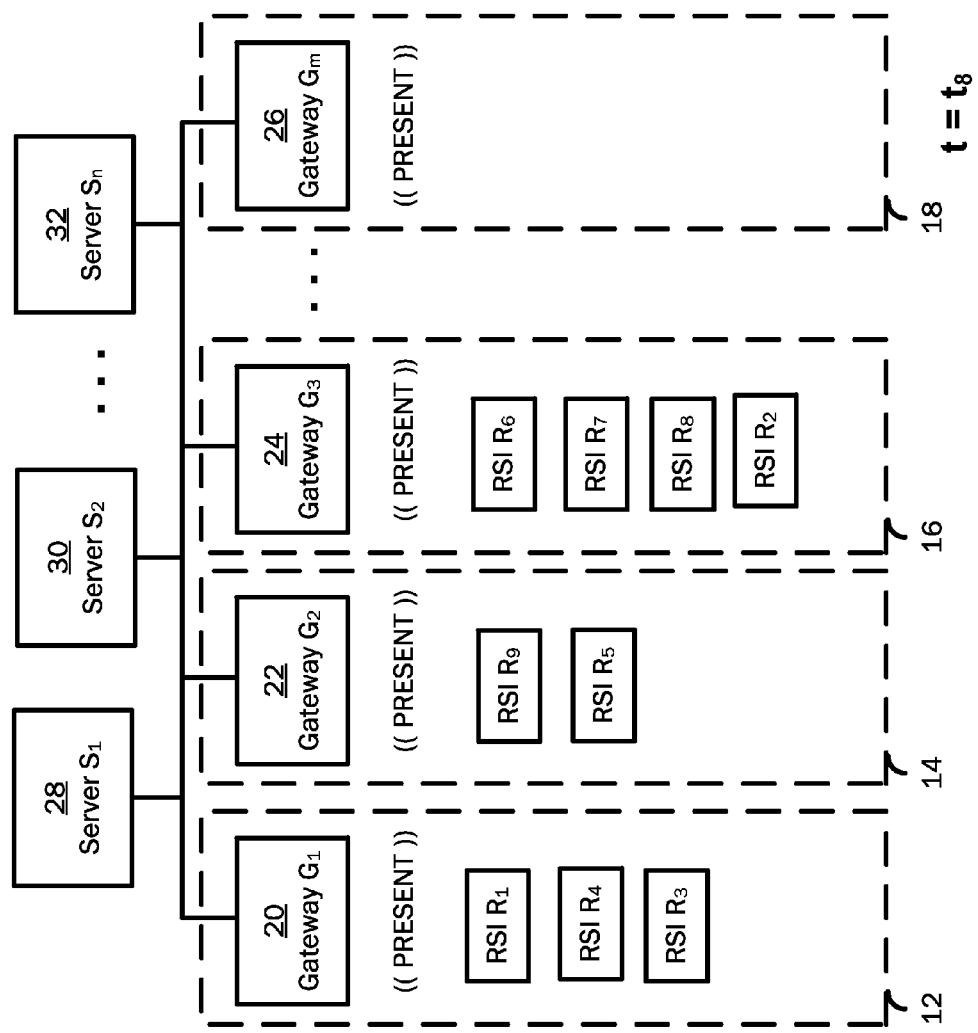
FIG. 8 is an eighth illustration representative of locations, states, and state transitions of radio frequency communication devices, at an eighth time subsequent to the seventh time, in accordance with one or more preferred embodiments of the present invention.

Thereafter, each gateway 20,22,24,26 is shown in FIG. 8 making a respective subsequent Class-Present Wakeup Broadcast at an eighth time subsequent to the seventh. Again, the Class-Present Wakeup Broadcast made by each gateway 20,22,24,26 is received by each communication device within the respective area of the gateway; however, none of the communication devices 10 is shown as responding to the Class-Present Wakeup Broadcast. In accordance with preferred embodiments of the invention, none of the communication devices 10 responds to the Class-Present Wakeup Broadcast because each communication device 10 has already responded as late as time $t_7$ to a previous Class-Present Wakeup Broadcast and has yet to be moved since such time of response. Accordingly, no responsive transmissions are needlessly made by any of the communication devices 10.

Each of the communication devices 10 shown in FIGS. 1-8 preferably operates in at least two states. In a first state, a communication device 10 responds to receipt of a Class-Present Wakeup Broadcast from a gateway 20,22,24,26 by making a transmission that includes an identification thereof. After this responsive transmission, the communication device 10 preferably enters a second state in which it does not respond to Class-Present Wakeup Broadcasts. The communication device 10 preferably remains in this second state until sensor-acquired information received through an interface thereof indicates that a predefined condition has occurred, such as movement of the communication device 10. Upon the occurrence of the predefined condition, the communication device 10 preferably makes a transmission that includes an indication of the occurrence of the predefined condition as well as an identification of the communication device 10. Upon making the transmission, the communication device 10 preferably enters the first state.

During each of the two states, the communication device 10 still wakes up and/or responds to any transmission that includes a common designation (such as a class designation) that matches a common designation of the communication device 10. Preferably, each communication device 10 keeps a table of applicable common designations to which it belongs. In this respect, a common designation preferably is used to represent the Class-Present Wakeup Broadcast and this common designation is either enabled or disabled in the table as maintained by the communication device 10 depending upon whether the communication device 10 should respond to a Class-Present Wakeup Broadcast that is next received.

Specifically, after the communication device 10 has made a responsive transmission to a Class-Present Wakeup Broadcast, the communication device 10 preferably enables a motion sensor, disables the "present" common designation in its table, and waits to be awoken upon an indication of movement from the motion sensor. Furthermore, the enablement of the motion sensor and the disablement of the "present" common designation in its table may be automatically performed by the communication device itself following its response to the Class-Based Wakeup Broadcast, or may be performed by the communication device in direct response to instructions received from a server following the identification of the presence of the RSI to the server.

Thereafter, once the communication device 10 moves, the communication device 10 is awoken by the motion sensor and communicates, via a respective gateway, an indication of such movement to the appropriate server. The communication device 10 also then disable the motion sensor and enables the "present" common designation for waking up of the communication device 10 for response to the next Class-Present Wakeup Broadcast.

This algorithm for entering the two different states enables the communication device 10: to "check in" when it arrives within an area of a gateway; to remain off or in standby after it has "checked in" in order to conserve internal power and avoid spurious transmissions; and to alert an appropriate server if the communication device 10 is moved.

A benefit of at least one embodiment of the invention is the avoidance of unnecessary and/or undesired radio frequency transmissions during air shipments in a cargo area of an airplane. Specifically, when communication devices 10, preferably associated with assets being tracked and/or monitored, are loaded into the cargo area of an airplane, a Class-Present Wakeup Broadcast is made in order to identify the communication devices present for taking inventory of the cargo. An instruction then is broadcast causing the communication devices to enter the second state, in which the motion sensors then are disabled. A Class-Present Wakeup Broadcast is not made until after the airplane has arrived at its intended location.

Since the motion sensor is turned off when the "present" common designation is enabled, the communication device 10 will not continuously try to report back to the server while it is in motion in the airplane. During movement, such as that associated with air transportation, the communication device 10 thus remains in a power conservation mode until it comes within range of the next gateway and receives a Class-Present Wakeup Broadcast.

As will be appreciated from the foregoing description, the movement of a communication device 10 is tightly monitored by one or more servers, since any communication device 10 within range of a gateway 20,22,24,26 reports when a predefined condition, e.g., movement, has occurred that indicates that it has been likely moved out of the respective area in which it was residing. Moreover, unnecessary transmissions in response to Class-Present Wakeup Broadcasts are avoided when a communication device 10 has not moved out of the respective area in which it resides.

In alternatives to the arrangements represented in FIGS. 1-8, the n servers can be consolidated into a single server; and/or one or more servers can be combined with one or more gateways. Such changes may reduce networking costs, delays, and overhead associated with asset tracking systems, but the flexibility, capabilities, and/or robustness of the systems likewise may be reduced.

One or more aspects of the invention further may be utilized with a single area for maintaining visibility of assets within the single area without regard to visibility of the assets in other areas, if desired.

Another benefit of at least one embodiment of the invention is the ability to synchronize reporting from a plurality of radio frequency communication devices to a server. In this respect, radio frequency communication devices preferably communicate data that otherwise is being stored to a server concurrently when responding to a Present Broadcast. The concurrent communication of the data with a Present Response obviates the need for the communications device to wakeup at a later time for the specific purposes of communicating the stored data. As such, a group of communication devices can be manipulated, for example, into the first state such that each responds to a Present Broadcast by communicating not only a Present Response, but the stored data at each respective communication device. Such manipulation into the first state can occur, for example, by creating a predetermined condition (e.g., change in temperature, change in location, or movement), resulting in sensor signals causing the communication devices to enter the first state from the second state; and/or by broadcasting an instruction to the communication devices to enter the first state.

In view of the foregoing, one or more benefits of one or more aspects of the present invention include: an increased battery life; the ability to transport assets by land, sea, or air without unnecessary or unwanted transmissions from the radios associated with the assets; the ability to still communicate "on demand" with a particular asset based on a common designation or class; the ability to determine assets newly arrived within an area "on demand" independent of any broadcasts at regular time intervals; the ability of an asset to "hide" from unauthorized persons by not needlessly identifying its presence in response to a general radio frequency broadcast; and the ability to determine when an asset is moved from an area once the asset has been identified as having arrived within the area.

What is claimed is:

1. A wireless two-way radio frequency (RF) data communication device comprising a data packet radio component that selectively reveals its presence in response to RF transmissions, the wireless two-way RF data communication device configured to operate in at least two states comprising:
  (a) a first state, in which the wireless two-way RF data communication device,
    (i) receives RF transmissions;
    (ii) maintains at least one common designation for purposes of filtering RF transmissions received by the wireless two-way RF data communication device;
    (iii) identifies specific data in a received RF transmission; and
    (iv) in response to the received RF transmission in which the specific data is identified,
      (A) transmits a response,
        (I) if the identified specific data includes data representative of an inquiry as to the presence of one or more wireless two-way RF data communication devices, and
        (II) if the identified specific data includes data that corresponds to at least one maintained common designation, and
      (B) does not transmit a response, (I) if the identified specific data does not include data representative of an inquiry as to the presence of one or more wireless two-way RF data communication devices, or (II) if the identified specific data does not correspond to at least one maintained common designation; and (b) a second state mutually exclusive to the first state, in which the wireless two-way RF data communication device, (i) receives RF transmissions;

(ii) maintains at least one common designation for purposes of filtering RF transmissions received by the wireless two-way RF data communication device;

(iii) identifies specific data in a received RF transmission; and (iv) does not transmit a response to the received RF transmission in which specific data is identified when, (A) the identified specific data includes data representative of an inquiry as to the presence of one or more wireless two-way RF data communication devices, and (B) the identified specific data corresponds to at least one maintained common designation, whereby the wireless two-way RF data communication device selectively communicates its presence in response to RF transmissions.

2. The wireless two-way RF data communication device of claim 1, wherein the wireless two-way RF data communication device enters the second state from the first state upon transmitting a response when, (a) the identified specific data includes data representative of an inquiry as to the presence of one or more wireless two-way RF data communication devices, and (b) the identified specific data includes data that corresponds to at least one maintained common designation.

3. The wireless two-way RF data communication device of claim 1, wherein the wireless two-way RF data communication device enters the first state from the second state upon receiving, through a sensor interface of the wireless two-way RF data communication device, one or more sensor signals indicative of a predetermined condition.

4. The wireless two-way RF data communication device of claim 1, wherein the wireless two-way RF data communication device enters the first state from the second state upon receiving a RF transmission including an instruction to enter the first state.

5. The wireless two-way RF data communication device of claim 1, wherein the wireless two-way RF data communication device enters the first state from the second state upon expiration of predetermined period of time as indicated by a timer of the wireless two-way RF data communication device.

6. The wireless two-way RF data communication device of claim 1, wherein the wireless two-way RF data communication device enters the first state from the second state after a predetermined number of failed attempts to communicate by the wireless two-way RF data communication device have occurred.

7. The wireless two-way RF data communication device of claim 1, wherein the wireless two-way RF data communication device enters the second state from the first state upon receiving a RF transmission including an instruction to enter the second state.

8. The wireless two-way RF data communication device of claim 1, wherein the identified specific data is found to correspond to at least one maintained common designation when the identified specific data matches at least one maintained common designation.

9. The wireless two-way RF data communication device of claim 1, wherein the at least one maintained common designation comprises at least one maintained class designation, and wherein the identified specific data is found to correspond to at least one maintained common designation when the identified specific data matches a maintained class designation.

10. The wireless two-way RF data communication device of claim 1, wherein the at least one maintained common designation comprises at least one maintained class designation, and wherein the identified specific data is found to correspond to at least one maintained common designation when the identified specific data matches an abstracted class of the maintained class designation.

11. The wireless two-way RF data communication device of claim 1, wherein the at least one maintained common designation comprises at least one maintained class designation, and wherein the identified specific data is found to correspond to at least one maintained common designation when the identified specific data matches a subclass of the maintained class designation.

12. The wireless two-way RF data communication device of claim 1, wherein the wireless two-way RF data communication device maintains a unique identification of the wireless two-way RF data communication device in addition to the at least one common designation used for purposes of filtering RF transmissions received by the wireless two-way RF data communication device.

13. A data communications network, comprising:

(a) a plurality of wireless two-way radio frequency (RF) data communication devices, each wireless two-way RF data communication device forming a node of the data communications network and each wireless two-way RF data communication device including a memory having stored therein at least one common designation for purposes of filtering RF transmissions received by the wireless two-way RF data communication device;

(b) wherein each wireless two-way RF data communication device is configured to operate in at least two states comprising:

(i) a first state, in which the wireless two-way RF data communication device, (A) receives RF transmissions;

(B) identifies specific data in a received RF transmission; and (C) in response to the received RF transmission in which the specific data is identified, (I) transmits a response, (1) if the identified specific data includes data representative of an inquiry as to the presence of one or more wireless two-way RF data communication devices, and (2) if the identified specific data includes data that corresponds to at least one maintained common designation, and (II) does not transmit a response, (1) if the identified specific data does not include data representative of an inquiry as to the presence of one or more wireless two-way RF data communication devices, or (2) if the identified specific data does not correspond to at least one maintained common designation; and (ii) a second state mutually exclusive to the first state, in which the wireless two-way RF data communication device,
(A) receives RF transmissions;
(B) identifies specific data in a received RF transmission; and
(C) does not transmit a response to the received RF transmission in which specific data is identified when,
(I) the identified specific data includes data representative of an inquiry as to the presence of one or more wireless two-way RF data communication devices, and
(II) the identified specific data corresponds to at least one maintained common designation,
whereby the wireless two-way RF data communication device selectively communicates its presence in response to RF transmissions.

14. The data communications network of claim 13, wherein each wireless two-way RF data communication device enters the second state from the first state upon transmitting a response when,
(a) the identified specific data includes data representative of an inquiry as to the presence of one or more wireless two-way RF data communication devices, and
(b) the identified specific data includes data that corresponds to at least one maintained common designation.

15. The data communications network of claim 13, wherein each wireless two-way RF data communication device enters the first state from the second state upon receiving, through a sensor interface of the wireless two-way RF data communication device, one or more sensor signals indicative of a predetermined condition.

16. The data communications network of claim 13, wherein each wireless two-way RF data communication device enters the first state from the second state upon receiving a RF transmission including an instruction to enter the first state.

17. The data communications network of claim 13, wherein each wireless two-way RF data communication device enters the first state from the second state upon expiration of predetermined period of time as indicated by a timer of the wireless two-way RF data communication device.

18. The data communications network of claim 13, wherein each wireless two-way RF data communication device enters the first state from the second state after a predetermined number of failed attempts to communicate by the wireless two-way RF data communication device have occurred.

19. The data communications network of claim 13, wherein each wireless two-way RF data communication device enters the second state from the first state upon receiving a RF transmission including an instruction to enter the second state.

20. A method of selectively responding to RF transmissions by a wireless two-way radio frequency (RF) data communication device comprising a data packet radio component, the method comprising:
(a) receiving RF transmissions;
(b) maintaining at least one common designation for purposes of filtering RF transmissions received by the wireless two-way RF data communication device;
(c) if in a first state,
(i) identifying specific data in a received RF transmission and, in response to the received RF transmission in which the specific data is identified,
(A) transmitting a response,
(I) if the identified specific data includes data representative of an inquiry as to the presence of one or more wireless two-way RF data communication devices, and
(II) if the identified specific data includes data that corresponds to at least one maintained common designation, and
(B) not transmitting a response,
(I) if the identified specific data does not include data representative of an inquiry as to the presence of one or more wireless two-way RF data communication devices, or
(II) if the identified specific data does not correspond to at least one maintained common designation; and
(d) if in a second state, the second state being mutually exclusive of the first state, identifying specific data in a received RF transmission and not transmitting a response to the received RF transmission when,
(i) the identified specific data includes data is representative of an inquiry as to the presence of one or more wireless two-way RF data communication devices, and
(ii) the identified specific data includes data corresponds to at least one maintained common designation.

* * * * *